United States Patent
Salas et al.

(10) Patent No.: US 7,111,300 B1
(45) Date of Patent: Sep. 19, 2006

(54) DYNAMIC ALLOCATION OF COMPUTING TASKS BY SECOND DISTRIBUTED SERVER SET

(75) Inventors: Jonathan C. Salas, Byron, CA (US); Sanjeev Radhakrishnan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 09/759,868

(22) Filed: Jan. 12, 2001

(51) Int. Cl.
G06F 9/46 (2006.01)
G06F 15/16 (2006.01)

(52) U.S. Cl. .................. 718/105; 709/203; 709/226; 709/229; 709/232

(58) Field of Classification Search .......... 718/1–108; 709/200–244
See application file for complete search history.

(56) References Cited

U.S. PATENT DOCUMENTS

| | | | | |
|---|---|---|---|---|
| 6,007,545 A * | 12/1999 | Venturelli | .................... | 606/108 |
| 6,067,580 A * | 5/2000 | Aman et al. | ................. | 719/330 |
| 6,185,601 B1 * | 2/2001 | Wolff | ......................... | 709/203 |
| 6,223,205 B1 * | 4/2001 | Harchol-Balter et al. | ... | 718/105 |
| 6,249,800 B1 * | 6/2001 | Aman et al. | ................. | 718/105 |
| 6,304,967 B1 * | 10/2001 | Braddy | ....................... | 713/150 |
| 6,415,323 B1 * | 7/2002 | McCanne et al. | ........... | 709/225 |
| 6,463,457 B1 * | 10/2002 | Armentrout et al. | ........ | 709/201 |
| 6,513,060 B1 * | 1/2003 | Nixon et al. | ................. | 709/203 |
| 6,578,066 B1 * | 6/2003 | Logan et al. | ................ | 718/105 |
| 6,578,068 B1 * | 6/2003 | Bowman-Amuah | ......... | 709/203 |
| 6,687,735 B1 * | 2/2004 | Logston et al. | ............. | 709/203 |
| 6,711,616 B1 * | 3/2004 | Stamm et al. | .............. | 709/226 |
| 6,718,387 B1 * | 4/2004 | Gupta et al. | ................ | 709/226 |
| 6,748,447 B1 * | 6/2004 | Basani et al. | ............... | 709/244 |
| 6,801,949 B1 * | 10/2004 | Bruck et al. | ................ | 709/232 |
| 6,886,035 B1 * | 4/2005 | Wolff | ......................... | 709/219 |
| 6,922,832 B1 * | 7/2005 | Barnett et al. | ................. | 718/1 |
| 6,993,587 B1 * | 1/2006 | Basani et al. | ............... | 709/229 |
| 2002/0073134 A1 * | 6/2002 | Barnett et al. | .............. | 709/105 |

OTHER PUBLICATIONS

Hamdi et al., "Dynamic Load Balancing of Data Parallel Applications on a Distributed Network", ACM, 1995, pp. 170-179.*
Colajanni et al., "Adaptive TTL Schemes for Load Balancing of Distributed Web Servers", ACM Sigmetrics Performance Evaluation Review, 1997, pp. 36-42.*

* cited by examiner

Primary Examiner—Majid Banankhah
Assistant Examiner—Jennifer N. To
(74) Attorney, Agent, or Firm—Osha Liang LLP

(57) ABSTRACT

A method for dynamic allocation of computing tasks includes requesting a computing task by a client; receiving the computing task by a first distributor server set; redirecting the computing task to a second distributor server set, the second distributor server set including a first server; and allocating the computing task from the first server to a second server that executes the computing task, where the allocation is based on matching an attribute of the second server to an attribute of the computing task.

18 Claims, 5 Drawing Sheets

DYNAMIC ALLOCATION OF COMPUTING TASKS BY SECOND DISTRIBUTED SERVER SET

BACKGROUND INFORMATION

1. Field of the Invention

The invention relates in general to a distributed computing system, particularly to a system that allows dynamic allocation of computing tasks.

2. Description of Related Art

In the 1990's, the "Internet," a connection system that links computers worldwide in a network, has grown from mainly an academic usage to a widespread medium for the transfer of information. The Internet has been termed the so called "information superhighway." As more and more computers are connected via the Internet or a network such as an intranet or wide-area-network (WAN), information is not the only resource that is shared within a network of computers. A network will also be utilized in distributing computing tasks such as mathematical calculations, word processing, graphic design, and etc. Since tasks and files are distributed among various computers, a system is required to balance the computing tasks among a plurality of servers.

Presently, various load-balancing methods have been developed to address the problem of overloading computing tasks on one particular server. For example, for a web site having several servers but operating under a single uniform resource locator ("URL"), a domain name server ("DNS") will send information requests for a specific URL to specific IP addresses corresponding to the servers. In a round-robin DNS, load balancing is achieved by routing requests to these servers in sequential rotation based on their IP addresses. However, since the DNS just routes requests sequentially, this method does not consider the load of the servers and a request can be routed to a server that has failed or does not have the load to perform the request.

Another method is to dedicate a hardware device such as proxy gateways or an IP redirector to perform load balancing. The proxy gateway receives all the requests, queries the servers to determine their respective loads, and then distribute the requests accordingly. Responses from the servers are routed back to the network through the proxy gateway. Unlike the DNS-based method, all requests resolve to the IP address of the proxy server, which avoids the problem of failed servers. However, dedicated load balancers also have a drawback of relying on "old information" as the proxy gateway can only query the servers so often without creating undesirable overhead on the network. Also, these hardware devices only route tasks based on requests and do not consider other important aspects of a computing tasks. For example, in an Application Service Provider (ASP) model, client attributes, such as memory space and computing power, need to be matched up with the fulfillment server attributes, such as data format and size of the output. If the computing task is to produce a video image by the fulfillment server, the output of the server needs to be in a specific format that the client can visualize. Thus, there is a need for a load-balancer that can track the differing capabilities of various servers in fulfilling a client's need.

U.S. Pat. No. 6,128,279, to O'Neil et al., solves the old information problem by teaching a peer-to-peer load balancing method in which a server in a plurality of servers determines whether it can serve the request or whether it should direct the request to another server. Although the information is real-time, the redirecting of the request is accomplished by the server itself, which creates a problem with scalability. As server number increases, each server needs to track the load of other servers and thus, diverts the server's computing power from its main task of fulfilling requests. Also, like the previous methods mentioned, the peer-to-peer load balancing tracks only load and neglects various attributes of a client, a server, and a request.

Therefore, it is advantageous to have a scalable system to distribute computing tasks that considers attributes of the client, the server, and the request.

SUMMARY OF THE INVENTION

The invention enables distribution of computing task according to various attributes of a client, a server, and a computing task. The infrastructure for this system is a network, which enables a set of distributor servers to manage client requests and distribute such client requests to a set of fulfillment servers.

The preferred embodiments of this system would enable a client to distribute its computing tasks to a suitable fulfillment server that has all the required client attributes, computing task attributes, and server attributes. The system is scalable as additional sets of distributor servers can be added to manage the fulfillment servers. In addition, new distributor servers can be added to manage pre-existing distributor servers. Also, the distributor servers can be programmed to consider various attributes according to the usage of the system. In an alternative embodiment, the system can be used to parse a highly intense computing task into components and distribute said components to fulfillment servers that have idle computing power.

DETAILED DESCRIPTION OF PREFERRED EMBODIMENT

Figure 1A:
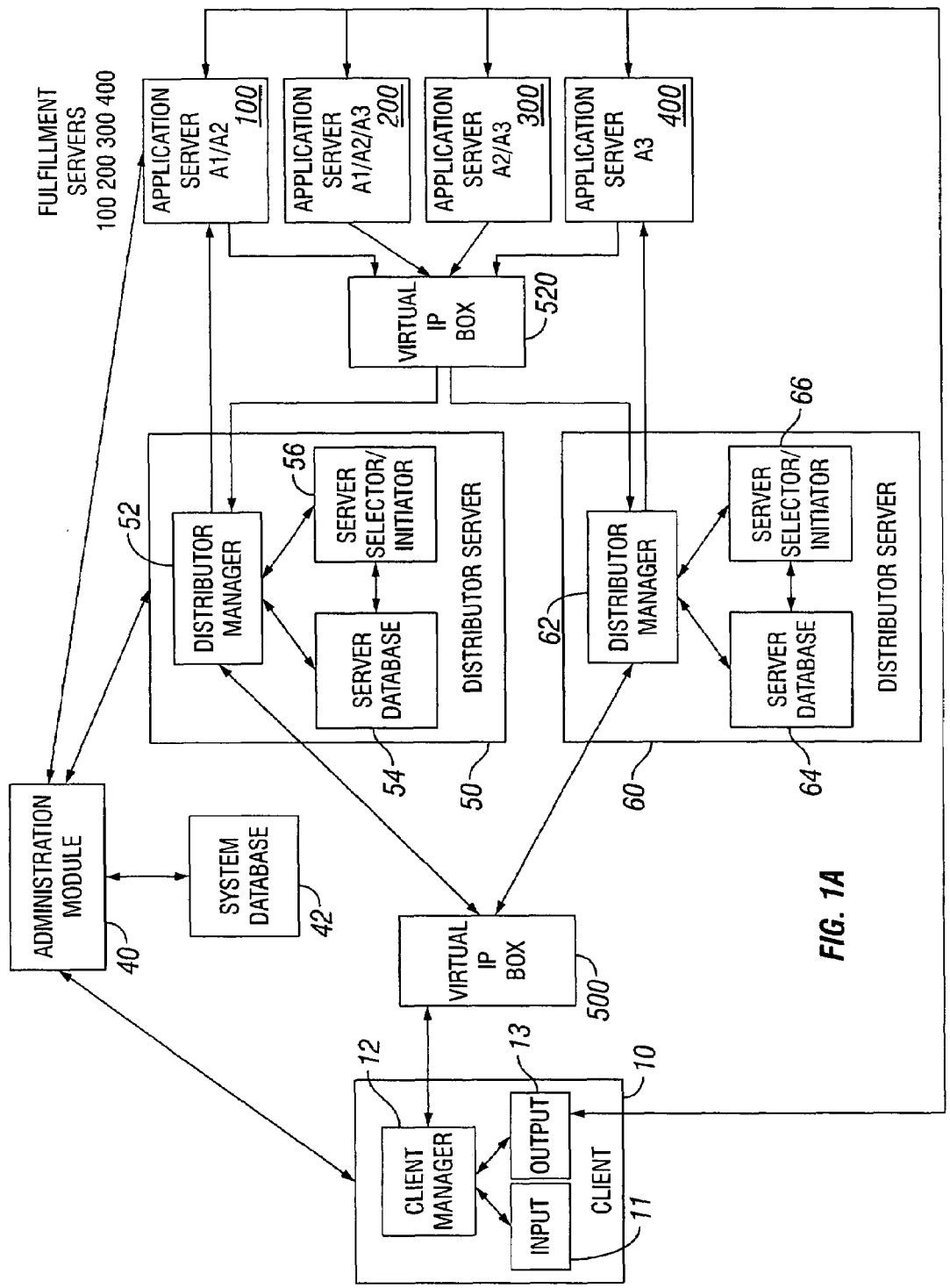
FIG. 1a is a block diagram of a computing task allocation system having a client component 10, distributor components 50 60, and fulfillment components 100 200 300 400 in accordance with the present invention.

The elements of the computing task allocation system in accordance with the invention can essentially be divided into three distinct components: client component 10, distributor component comprising of distributor servers 50 60, and fulfillment component comprising of application servers 100 200 300 400, as illustrated in FIG. 1a.

The system enables a user to access a suitable network resource, such as one of the application servers 100 200 300 400, to fulfill its computing task. The term "computing task" as described herein is defined as tasks that are performed by a microprocessor machine, such as word processing, graphic design, file sharing, printing, mathematical calculations, and etc. In the preferred embodiment, the system is used in an Application Service Provider (ASP) model, in which software applications A1 A2 A3 reside on fulfillment servers 100 200 300 400. Clients share and access the applications from the servers via a network. However, one skilled in the art should realize that the fulfillment servers could be software or microprocessor machines that can execute a computing task, such as a printer, a web-content server, or a database.

Figure 2:
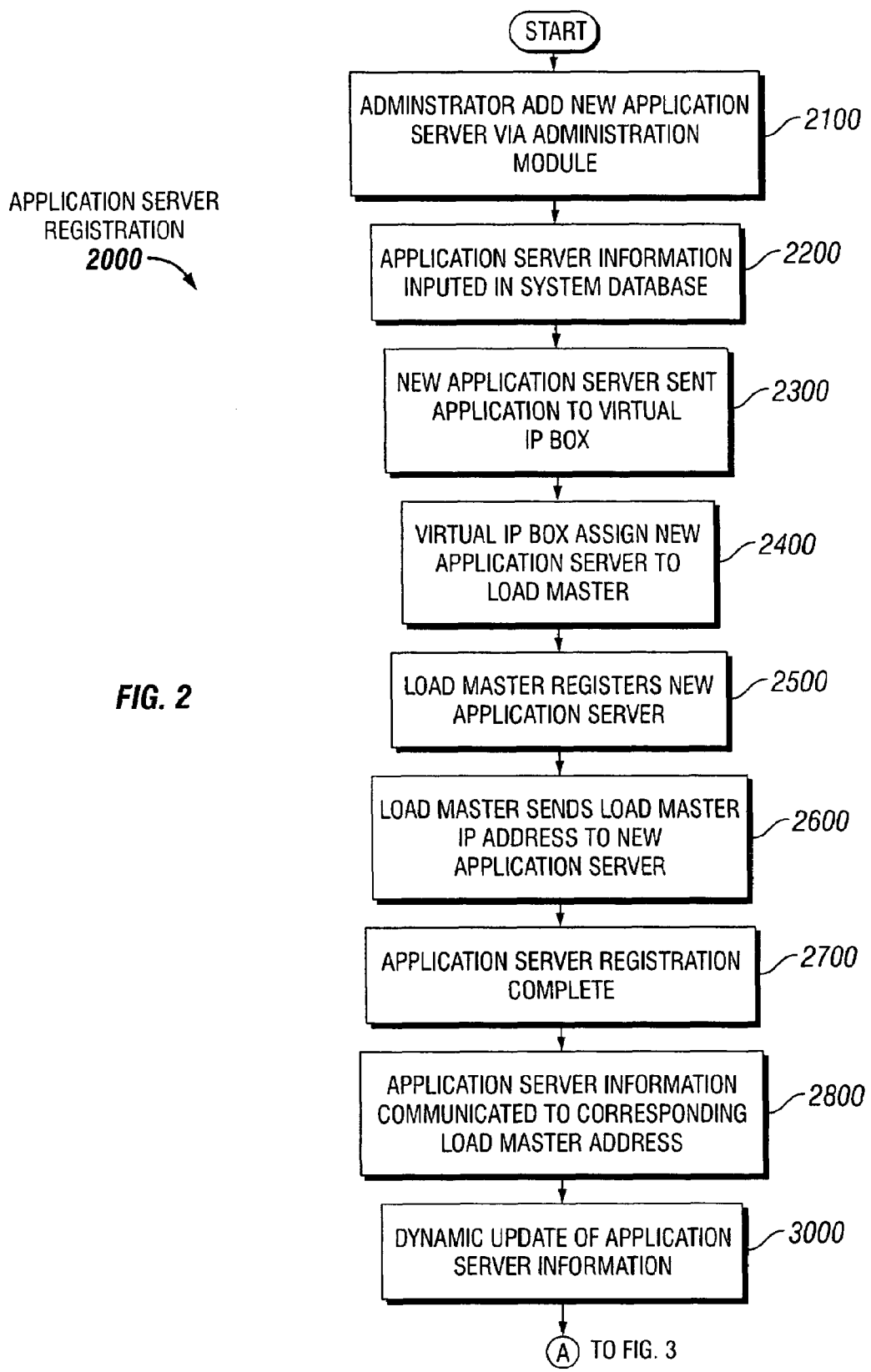
FIG. 2 is a logical flow chart that describes the process for application server registration.

All components of the system (client, distributor servers, and fulfillment servers) are connected to the system via registration through an administration module 40 and stored in a system database 42. In addition to the registration of each component to the system, each fulfillment server is registered with a specific distributor server, as illustrated in FIG. 2. Registration is completed by a fulfillment server 100 communicating its attributes such as "fulfillment server IP address," "type of application," "total computing power," "active computing power," "idle computing power," "data format selections," "memory", "security settings," "video hardware," and "network hardware." This initial registration is sent to a virtual IP box 520 which redirects the registration to a distributor server 50 60. The distributor manager 52 62 records the registration on the corresponding sever database 54 64 and sends its "distributor server IP address" to the fulfillment server 100. Subsequently, after registration if its attributes change, the fulfillment server 100 dynamically updates the server database 54 by sending current attributes to the distributor manager 52 via the "distributor server IP address" of the distributor server 50. Additionally, the fulfillment server can send attributes to the server database periodically (e.g. every two minute), by a triggering event (e.g. start of a computing task), by a server condition (i.e. if computing power is below a certain level), or any logical combination of the above-mentioned criteria.

After registration of the fulfillment servers, the client is able to distribute its computing tasks among the plurality of fulfillment servers. The client component 10 consists an input module 11 to request a computing task, a client manager 12 to track input and output data, and an output module 13 to present a result of the computing task. Client 10 communicates to the other components of the system via a network such as the Internet, a local area network (LAN) and/or wide area network (WAN), wireless and/or wired, or other network communication infrastructure.

The client 10 communicates computing tasks to a virtual Internet Protocol (IP) box 500 that sequentially redirects the computing tasks among the distributor servers 50 60. Once the computing task reaches the distributor manager 52 62, the distributor manager will search a corresponding server database 54 64. For example, distributor manager 52 will search the server database 54 to find a fulfillment server from the plurality of fulfillment servers 100 200 300 400 that match the attributes of the computing task and the client. If no suitable fulfillment server is found, a server selector 56 will re-direct the computing task to another distributor server 60. If a suitable server is found, the server selector 56 sends the corresponding IP address of the suitable server to the client 10 and the client 10 directly access the suitable fulfillment server via the IP address.

Figure 1B:
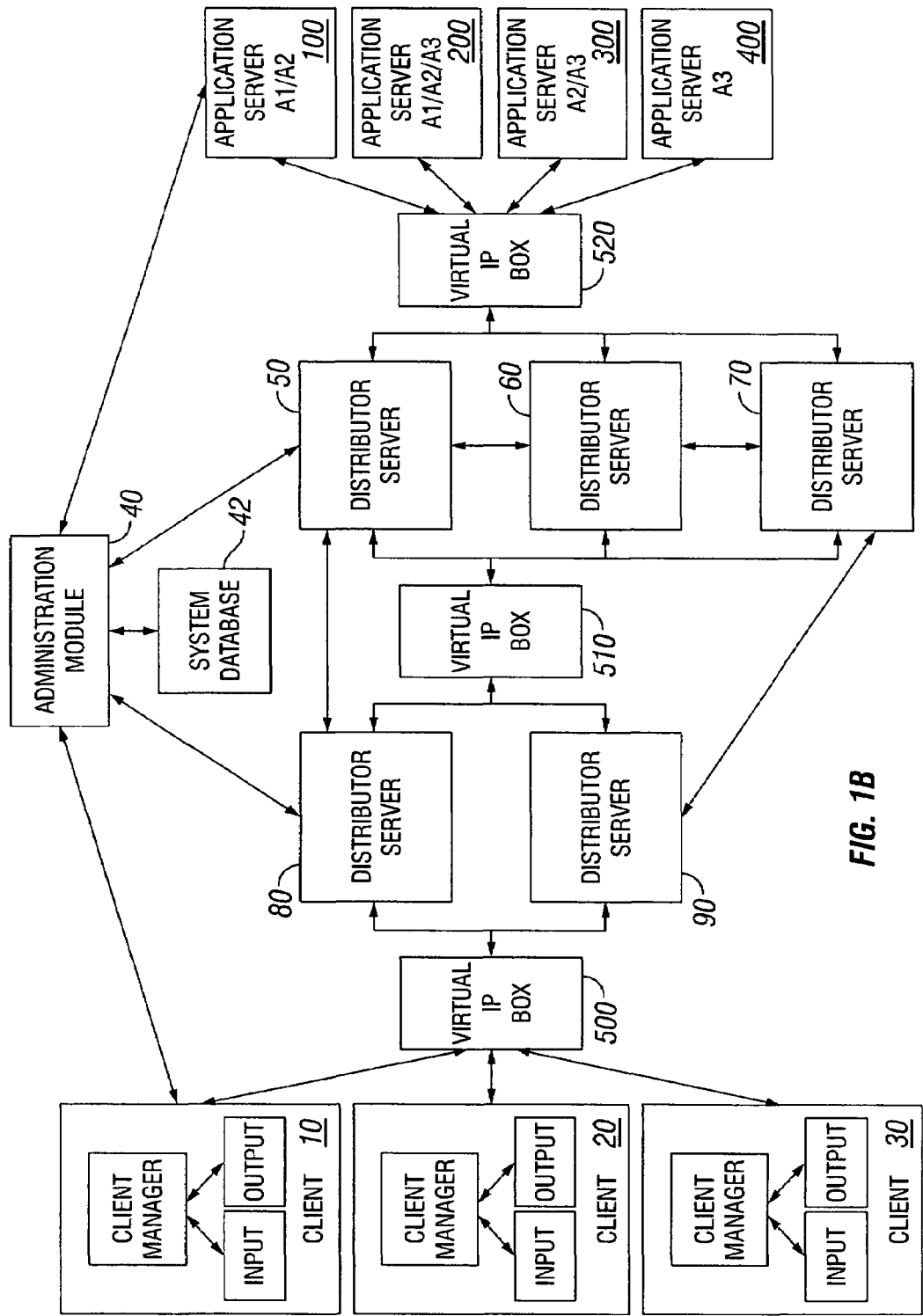
FIG. 1b illustrates the scalability of the system, wherein a plurality of clients 10 20 30 is coupled to one set of distributor servers, which manages a subsequent set of distributor servers that manages a set of fulfillment servers.

FIG. 1b illustrates the scalability of the system, as shown by a plurality of clients 10 20 30 communicating requests via a virtual IP box 500 to a set of distributor servers 80 90, which redirects the request to a distributor server in a second set of distributor server 50 60 70 that manages the fulfillment servers 100 200 300 400. As shown in FIG. 11b, the additional set of distributor server 80 90 is added to manage the original set of distributor server 50 60 in FIG. 1a. Thus, the system can grow exponentially instead of linearly. The fulfillment server registration and dynamic update illustrated in FIG. 11a is also utilized in registering and updating the attributes of the set of distributor servers 50 60 70 to a corresponding distributor server 80 90.

FIG. 2 describes the process for a fulfillment server registration 2000, particularly to an application server in an ASP model. For each new application server, a system administrator will add the application server 100 via the administration module 2100.

After application sever attributes are recorded in the system database 2200, the application server sends 2300 its attributes to a virtual IP box 520, which redirects 2400 the information to a distributor server 50. In step 2500, the distributor manager 52 registers the information in its server database 54 and sends 2600 its "distributor server IP address" to the application server 100. After completion of registration 2700, the application server 100 sends 2800 its attributes to distributor server 50 directly via the "distributor IP address," and attributes in the server database 54 is dynamically updated accordingly 3000, as illustrated in FIG. 3.

Figure 3:
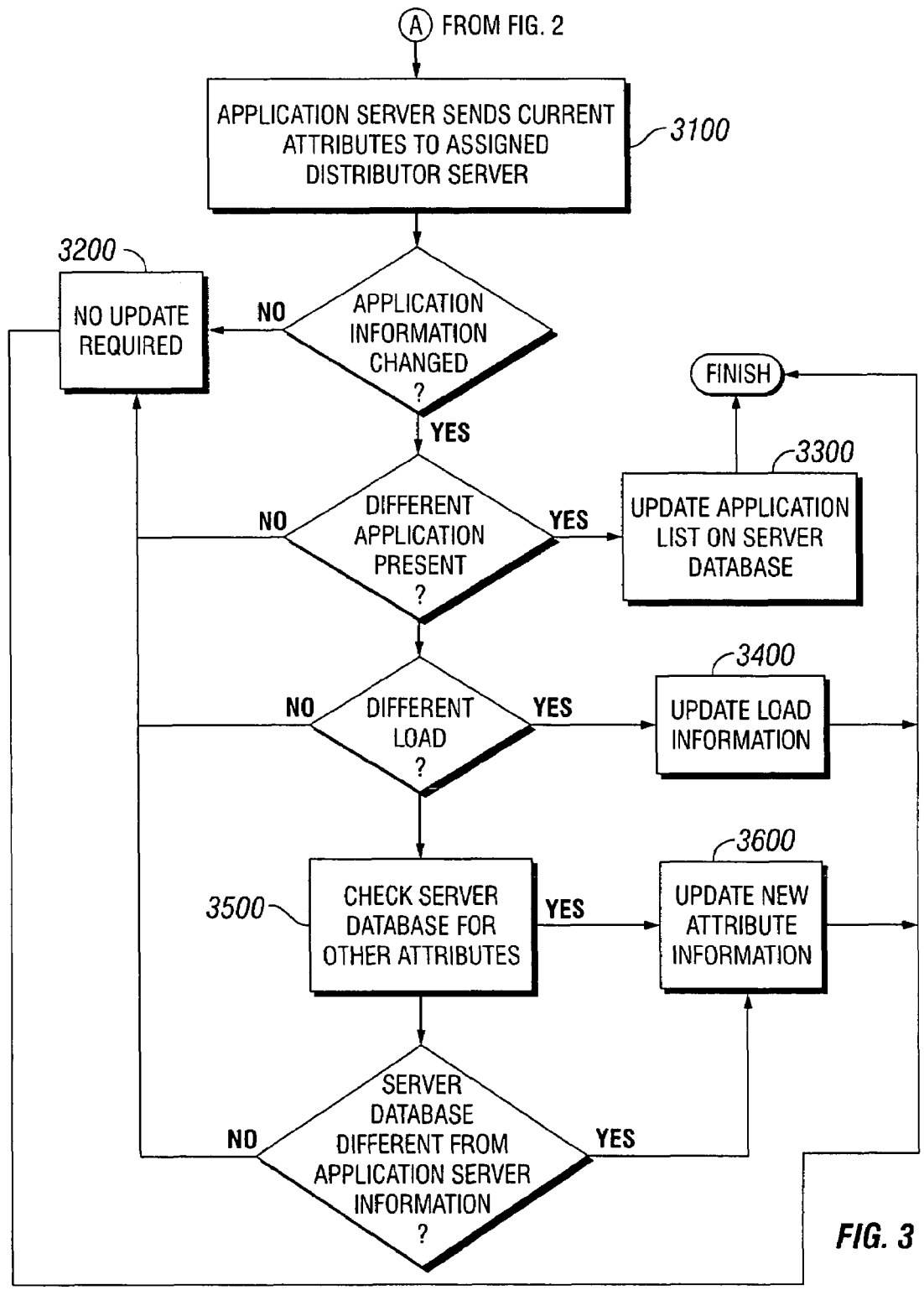
FIG. 3 is a logical flow chart that describes the process for dynamic update of application server information.

FIG. 3 describes the dynamic update of application server information. The application server 50 sends current attributes 3100 to the assigned distributor 50. In the preferred embodiment, the application server is programmed to send its current attributes when its attributes change from the previous update. Additionally, the application server can be programmed to send its current attributes based on a triggering event such as finishing of a job or starting of a job, and/or time interval, such as every minute or every five minutes. After receiving the information, the distributor manager 52 dynamically updates the server database 54 if the current attributes received are different from attributes in the database 54. If attributes are the same, no update is required 3200. If attributes are different, the distributor manager determines whether there are different applications residing on the application server 50. If applications are the same, no update is required 3200, but if applications are different, the application list is updated on server database 3300. Then, the distributor manager checks to see whether the load information is different. If load is different, then load information is updated in the server database 3400. If load is the same, then no update is required 3200 and other attributes of the application server is reviewed for update 3500. Final check is performed to ensure server database matches the current attributes that was sent in step 3100.

Figure 4:
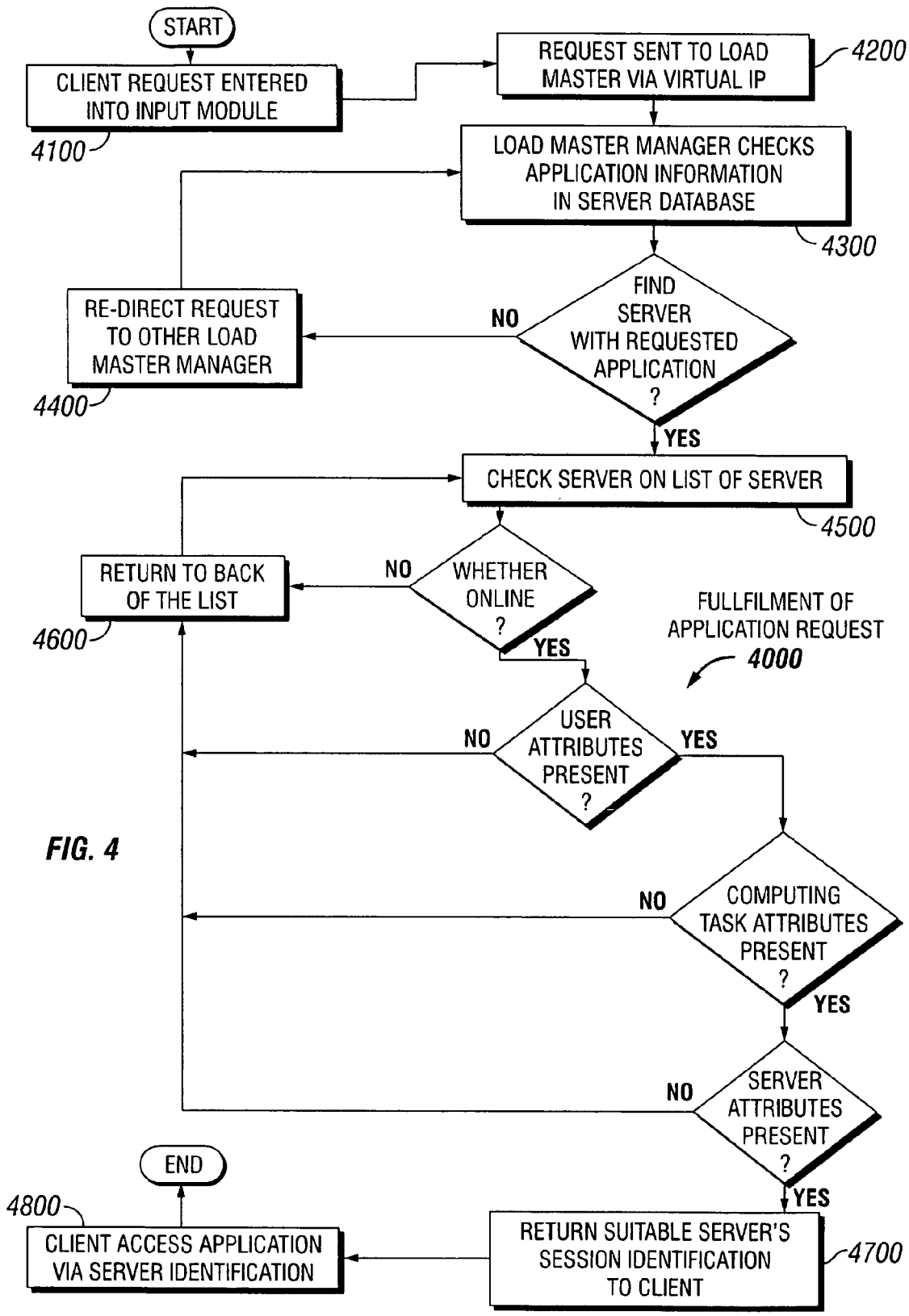
FIG. 4 is a logical flow chart that describes a sample usage of the system, wherein the computing task is a request for a software application.

FIG. 4 describes the process for fulfilling a client request of an application 4000. Client request is entered into the input module 4100 and client manager directs the request to the virtual IP box 500. The virtual IP box redirects the request to a distributor server 4200 and the distributor manager checks application information in server database 4300. If a server that has the requested application is not found, the request is re-directed to another distributor server. If one or more servers with the application are found, the distributor manager checks a first server on a list of servers with the requested application 4500. If the first server is active and online, the server is checked to see whether it has the required user attributes. As described herein, the term "user attributes" include "user preferences," such as data format, file size, detail of image, security settings, and "client attributes" such as client computing power, client memory, client visualization, client software, and client network connectivity. Then, the server is checked to see whether it has the required computing task attributes, such as requisite computing power and requisite memory for the computing task. The server is also checked to see whether it has the required server attributes, such as requisite application type, system software, total computing power, graphic processing, active computing power, idle computing power, file system accessibility, database accessibility, and network utilization. If the server has all the user attributes, all the computing task attributes, and all the server attributes, the server is a suitable server and the IP address of the server is sent to the client 4700 so that the client can access the application directly via the server IP address 4800. If the server does not contain all the attributes, the distributor manager returns to the list of servers that contained the requested application 4600 and checks another server 4500. In an alternative embodiment, the system can be used to parse a highly intense computing task into components and distribute said components to fulfillment servers that have idle computing power.

The above embodiments are only illustrative of the principles of this invention and are not intended to limit the invention to the particular embodiments described. One skilled in the art should recognize that computing tasks could include all types of tasks such as printing, word processing, project management, graphic design, mathematic calculations, and etc. In particular, it is contemplated that functional implementation of the invention described herein may be implemented equivalently in hardware, software, firmware, and/or other available functional components or building blocks. Accordingly, various modifications, adaptations, and combinations of various features of the described embodiments can be practiced without departing from the scope of the invention as set forth in the appended claims.

We claim:

1. A system to allocate a computing task comprising:
   a first distributor server set comprising a first plurality of distributor servers;
   a second distributor server set comprising a second plurality of distributor servers, wherein the first distributor server set is interposed between a client and the second distributor server set, wherein each of the second plurality of servers comprises a database, wherein at least one of the databases comprises an attribute associated with at least one of a plurality of application servers and a client attribute, wherein the client attributes corresponds to an attribute of the client;
   the plurality of application servers, wherein the plurality of application servers is operatively connected to the second distributor server set; and
   wherein each of the plurality of distributor servers in the first distributor server set is configured to receive the computing task from the client and redirect the computing task to at least one of the plurality of distributor servers in the second distributor server set,
   wherein each of the plurality of distributor servers in the second distributor server set includes functionality to select one of the plurality of application servers to use to execute the computing task,
   wherein the computing task is received from the client through a first virtual IP box, wherein the first virtual IP box sequentially redirects the computing task received from the client among the first plurality of distributor servers,
   wherein one of the plurality of distributor servers in the second distributor server set sends an Internet Protocol (IP) address to the selected one of plurality of application servers, and
   wherein the one of the plurality of application servers is selected using an attribute of the computing task and an attribute associated with at least one of the plurality of application servers,
   wherein the client can directly communicate with the selected one of the plurality of application servers using the IP address.

2. The system of claim 1, wherein the attribute associated with the at least one of the plurality of application servers is load capacity.

3. The system of claim 1, wherein the attribute associated with the at least one of the plurality of application servers is type of application residing on the at least one of the plurality of application servers.

4. The system of claim 1, wherein the attribute associated with the at least one of the plurality of application servers is idle computing power.

5. The system of claim 1, wherein the attribute associated with the at least one of the plurality of application servers is computing power.

6. The system of claim 1, wherein each of the plurality of servers in the second distributor server set comprising a database, wherein the database comprises the attribute associated with at least one of the plurality of application servers.

7. The system of claim 6, wherein the database is dynamically updated with a current value of the attribute associated with at least one of the plurality of application servers.

8. The system of claim 6, wherein the database further comprises a client attribute, wherein the user attributes corresponds to an attribute of the client.

9. The system of claim 6, wherein the database further comprises a computing task attribute, wherein the computing task attribute is associated with the computing task.

10. The system of claim 6, wherein functionality to select one of the plurality of application servers to use to execute the computing task comprises functionality to:
    query the database to determine the presence of an application server comprising an application required to service the computing task, wherein the application server corresponds to one of the plurality of application servers.

11. The system of claim 1, wherein the computing task is received from one of the plurality of distributor servers in the second distributor server set through a second virtual IP box, wherein the second virtual IP box sequentially redirects the computing task received by the one of the plurality of distributor servers in the first distributor server set among the plurality of distributor servers in the second distributor server set.

12. A method for dynamic allocation of a computing task comprising:
    receiving a computing task by one of a plurality of distributor servers in a first distributor server set from a client, wherein the computing task is received from the client through a first virtual IP box, wherein the first virtual IP box sequentially redirects the computing task received from the client among the plurality of distributor servers in the first distributor server set;
    redirecting the computing task to one of a plurality of distributor servers in a second distributor server set from the one of the plurality of distributor servers in the first distributor server set, wherein each of the plurality of servers in the second distributor server set comprises a database, wherein at least one of the databases comprises an attribute associated with at least one of a plurality of application servers and a client attribute, wherein the client attributes corresponds to an attribute of the client;
    selecting, by the one of the plurality of distributor servers in the second distributor server set, one of the plurality of application servers to service the computing task using an attribute of the computing task and the attribute associated with at least one of the plurality of application servers; and
    forwarding an Internet Protocol (IP) address of the selected one of the plurality of application servers to the client, wherein the client can directly communicate with the selected one of the plurality of application servers using the IP address.

13. The method of claim 12, wherein the database is dynamically updated with a current value of the attribute associated with at least one of the plurality of application servers.

14. The method of claim 12, wherein the database is dynamically updated with a current value of the attribute associated with at least one of the plurality of application servers.

15. The method of claim 12, wherein the database is updated where response to a triggering event.

16. The method of claim 12, wherein the database is updated periodically.

17. The method of claim 12, wherein the database is updated using a broadcast message.

18. The method of claim 12, wherein the database further comprises a computing task attribute, wherein the computing task attribute is associated with the computing task.

* * * * *